United States Patent
Usui et al.

(10) Patent No.: US 8,248,830 B2
(45) Date of Patent: Aug. 21, 2012

(54) POWER SOURCE APPARATUS

(75) Inventors: Hiroshi Usui, Niiza (JP); Takashi Kawaguchi, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 387 days.

(21) Appl. No.: 12/614,707

(22) Filed: Nov. 9, 2009

(65) Prior Publication Data
US 2010/0127685 A1 May 27, 2010

(30) Foreign Application Priority Data
Nov. 21, 2008 (JP) .................................. 2008-297647

(51) Int. Cl.
*H02H 7/217* (2006.01)
(52) U.S. Cl. .............................. 363/127; 363/70; 323/207
(58) Field of Classification Search .................. 323/207, 323/222, 266, 272, 274, 282, 258; 363/26, 363/55, 56.09, 65, 70, 86, 127, 21.09; 219/716, 219/717, 130.32
See application file for complete search history.

(56) References Cited

U.S. PATENT DOCUMENTS

| | | | | |
|---|---|---|---|---|
| 4,713,742 A * | 12/1987 | Parsley | ........................ | 363/124 |
| 4,858,093 A * | 8/1989 | Sturgeon | ........................ | 363/20 |
| 5,268,547 A * | 12/1993 | Bessyo et al. | ................. | 219/716 |
| 5,349,157 A * | 9/1994 | Blankenship | ............ | 219/130.32 |
| 6,738,274 B2 * | 5/2004 | Prasad et al. | ................... | 363/70 |
| 7,679,347 B2 * | 3/2010 | He et al. | ........................ | 323/282 |
| 7,760,525 B2 * | 7/2010 | Sutardja | ........................ | 363/71 |

FOREIGN PATENT DOCUMENTS
JP         2001-53459         2/2001

* cited by examiner

*Primary Examiner* — Rajnikant Patel
(74) *Attorney, Agent, or Firm* — Oblon, Spivak, McClelland, Maier & Neustadt, L.L.P.

(57) ABSTRACT

A power source apparatus has a power source unit (AC, DB, Ci), a pair of reactors L1a and L1b each having a winding, and a controller 10 to accumulate energy of the power source unit in the pair of reactors and control the accumulated energy by turning on/off a switching element Q1. The windings of the pair of reactors are arranged so that the windings face each other and the polarities of magnetic flux from the windings are opposite to each other.

4 Claims, 5 Drawing Sheets

POWER SOURCE APPARATUS

BACKGROUND OF THE INVENTION

1. Field of the Invention

The present invention relates to a power source apparatus that is suitable for a switching power source apparatus and is capable of reducing switching noise produced depending on a layout of windings or wiring.

2. Description of the Related Art

An example of a power source apparatus is disclosed in Japanese Unexamined Patent Application Publication No. 2001-53459 (in particular, FIG. 2 thereof). This power source apparatus is a thin-type power source apparatus having a metal base, a radiator attached to the metal base, circuit parts arranged on the metal base, a case covering the circuit parts and attached to the metal base, and a stud to attach the metal base including the radiator and case to a board. A winding is connected to an insulated copper foil pattern of the metal base.

FIG. 1 illustrates a power source apparatus of this type according to a related art. In FIG. 1, an AC power source AC provides a sinusoidal voltage, a bridge rectifier DB rectifies the sinusoidal voltage into a pulsating voltage, and a step-up-type power factor corrector steps up the pulsating voltage and corrects the power factor thereof. The step-up-type power factor corrector includes a reactor L1, a diode D1, a switching element Q1, and an output smoothing capacitor Co. An input capacitor Ci is to absorb normal-mode switching noise.

Operation of the power source apparatus illustrated in FIG. 1 will be explained. The sinusoidal voltage from the AC power source AC is rectified by the bridge rectifier DB, and through the input capacitor Ci, a full-wave-rectified waveform is supplied to the power factor corrector. A first controller 10 conducts ON/OFF control of the switching element Q1.

When the switching element Q1 is turned on, a current passes through a path extending along AC, DB, Ci, L1, Q1, Ci, DB, and AC, to accumulate energy in the reactor L1. When the switching element Q1 is turned off, the energy accumulated in the reactor L1 is combined with the voltage from the AC power source AC, to charge the output smoothing capacitor Co through the diode D1.

The stepped-up voltage supplied to the output smoothing capacitor Co is higher than a peak value of the sinusoidal voltage. Namely, the first controller 10 controls an input current and an output voltage, so that the voltage of the output smoothing capacitor Co keeps a constant value and the input current has a sinusoidal waveform similar to the input voltage.

SUMMARY OF THE INVENTION

To reduce the size of the reactor L1 of FIG. 1, a wire diameter of a winding of the reactor L1 must be thin or the number of turns of the winding must be small. If the power source apparatus satisfies these conditions and is operated at high switching frequencies, a copper loss or a core iron loss will increase due to the skin effect of the winding, and therefore, the reactor L1 will generate a large amount of heat.

To radiate the heat of the reactor L1, the reactor L1 is joined with a fin (radiator) 11 as illustrated in FIG. 1. The fin 11 suppresses the heat of the reactor L1 so that the reactor L1 may demonstrate high capacity with reduced dimensions.

The reactor L1, however, leaks magnetic flux outside. The leakage magnetic flux crosses the fin 11 attached to the reactor L1. The fin 11 is generally grounded to a frame for the safety, and therefore, the leakage magnetic flux causes noise to a frame ground voltage.

To suppress the noise, noise preventive parts such as a common-mode coil and a Y-capacitor (grounding capacitor) must be added. This increases the cost and size of the power source apparatus.

The present invention provides a power source apparatus that is inexpensive, compact, and capable of reducing switching noise dispersed through a radiation fin.

According to an aspect of the present invention, the power source apparatus includes a power source part; a pair of reactors each having a winding; and a controller configured to accumulate energy of the power source part in the pair of reactors and control the accumulated energy by turning on/off a switching element. The windings of the pair of reactors are arranged so that the windings face each other and the polarities of magnetic flux from the windings are opposite to each other.

According to another aspect of the present invention, the power source apparatus includes a power source part; a pair of transformers each having a plurality of windings; and a controller configured to accumulate energy of the power source part in the pair of transformers and control the accumulated energy by turning on/off a switching element. The plurality of windings of the pair of transformers are arranged so that the windings face each other and the polarities of magnetic flux from the windings are opposite to each other.

DESCRIPTION OF THE PREFERRED EMBODIMENTS

Power source apparatuses according to embodiments of the present invention will be explained in detail with reference to the drawings.

Embodiment 1

Figure 2:
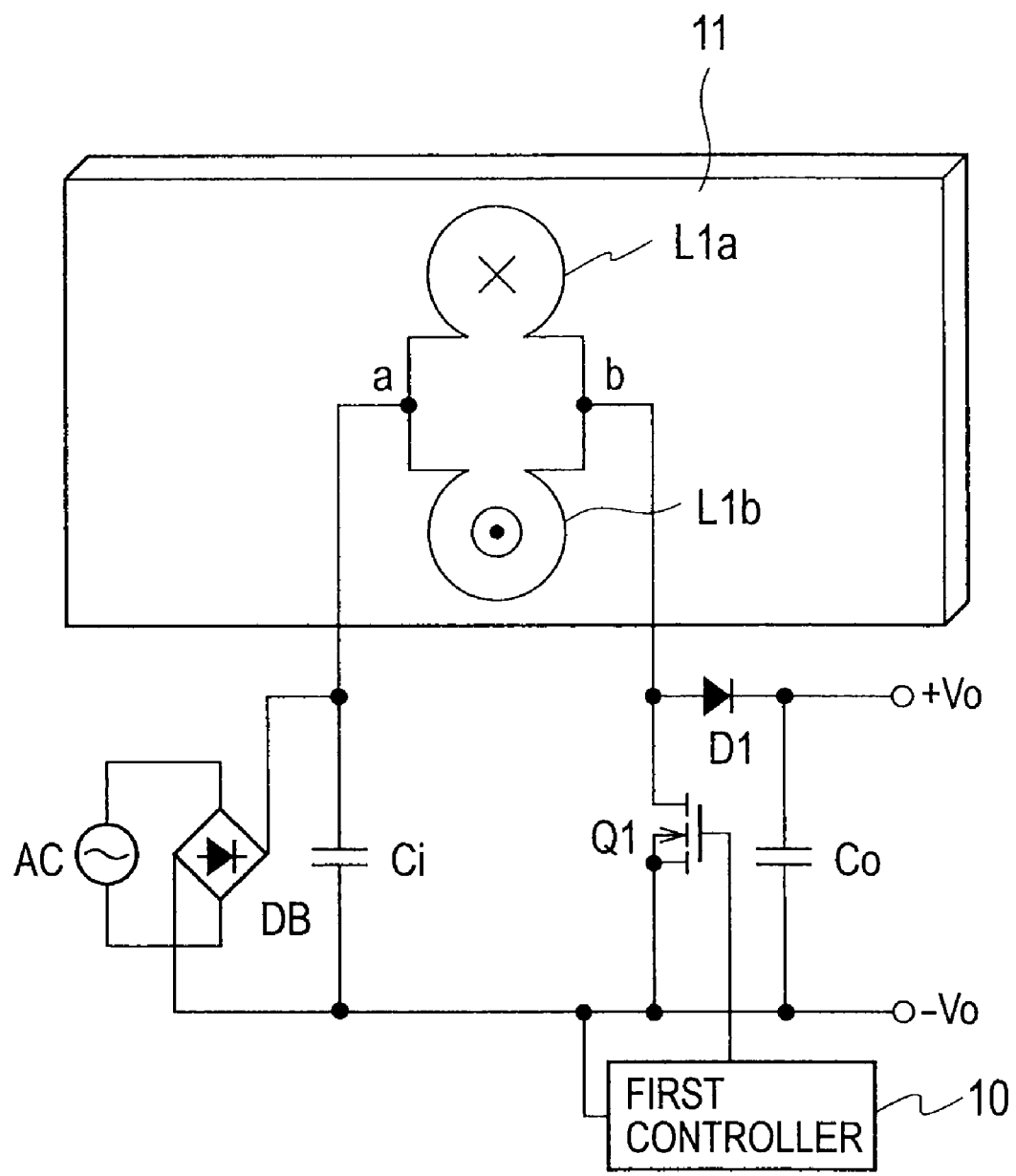
FIG. 2 is a circuit diagram illustrating a power source apparatus according to Embodiment 1 of the present invention.

FIG. 2 is a circuit diagram illustrating a power source apparatus according to Embodiment 1 of the present invention. In FIG. 2, the power source apparatus is applied to a power factor corrector.

Figure 1:
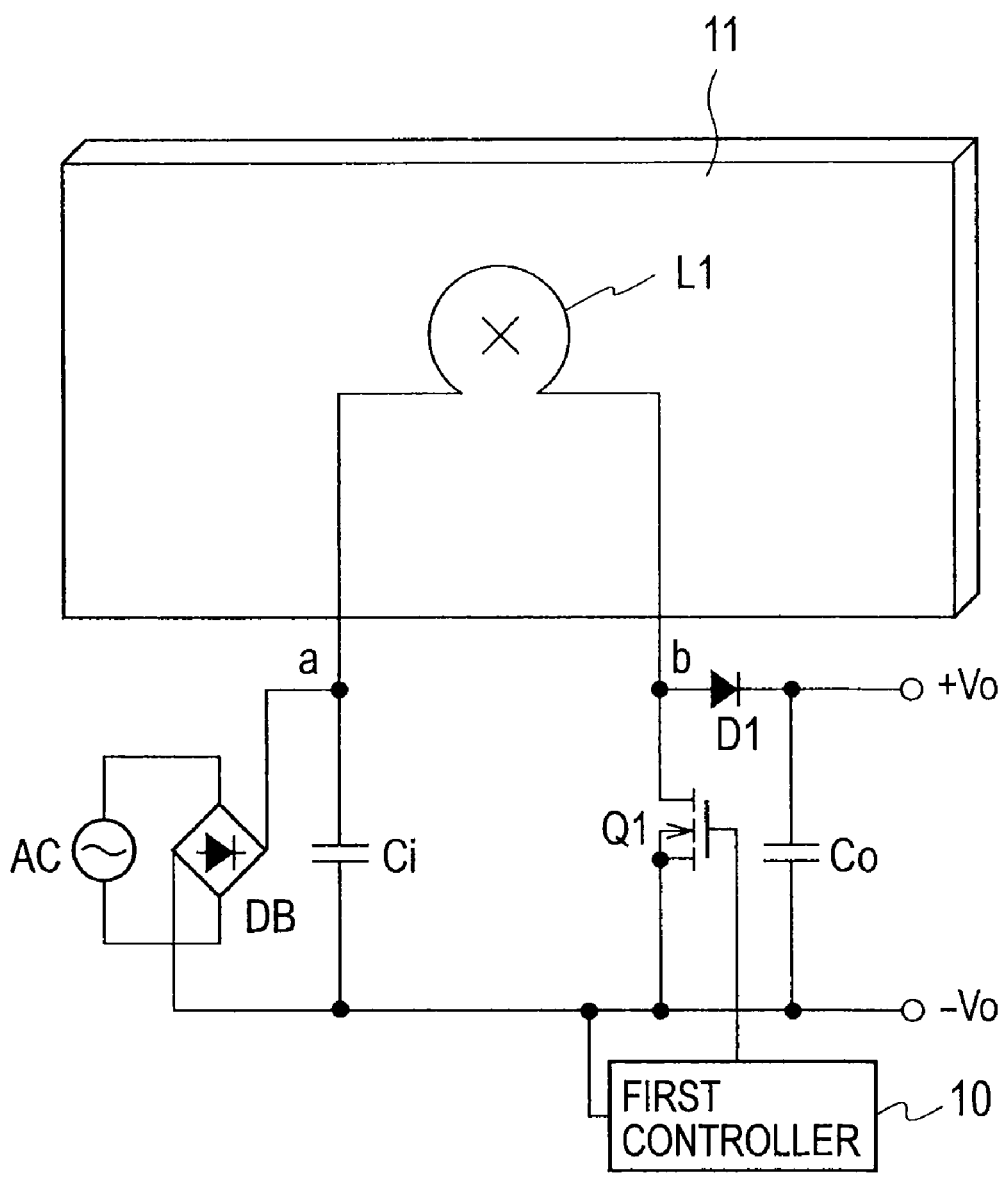
FIG. 1 is a circuit diagram illustrating a power source apparatus according to a related art.

In FIG. 2, the same parts as those of the related art illustrated in FIG. 1 are represented with the same reference marks, to omit the explanations of the same parts.

The power source apparatus according to Embodiment 1 has a pair of first and second reactors (inductance elements) L1a and L1b (each having the "winding" stipulated in the claims). The reactors L1a and L1b are connected in parallel with each other between connection points a and b.

The connection point a is connected to an input capacitor Ci and a bridge rectifier DB. The connection point b is connected to a drain of a switching element Q1 made of, for example, a MOSFET and an anode of a diode D1.

The first and second reactors L1a and L1b are arranged to face each other and are thermally coupled with a radiation fin 11 (corresponding to the "metal body" stipulated in the claims). The polarity of magnetic flux produced by the first reactor L1a and the polarity of magnetic flux produced by the second reactor L1b are opposite to each other. Namely, the magnetic flux (indicated with a cross in FIG. 2) of the first reactor L1a passes from a front surface of the radiation fin 11 to a rear surface thereof and the magnetic flux (indicated with a dot in FIG. 2) of the second reactor L1b passes from the rear surface of the radiation fin 11 to the front surface thereof.

Operation of the power source apparatus of FIG. 2 is basically the same as that of the power source apparatus of FIG. 1 except a current path due to the division of the reactor L1 into the first and second reactors L1a and L1b.

Figure 3A:
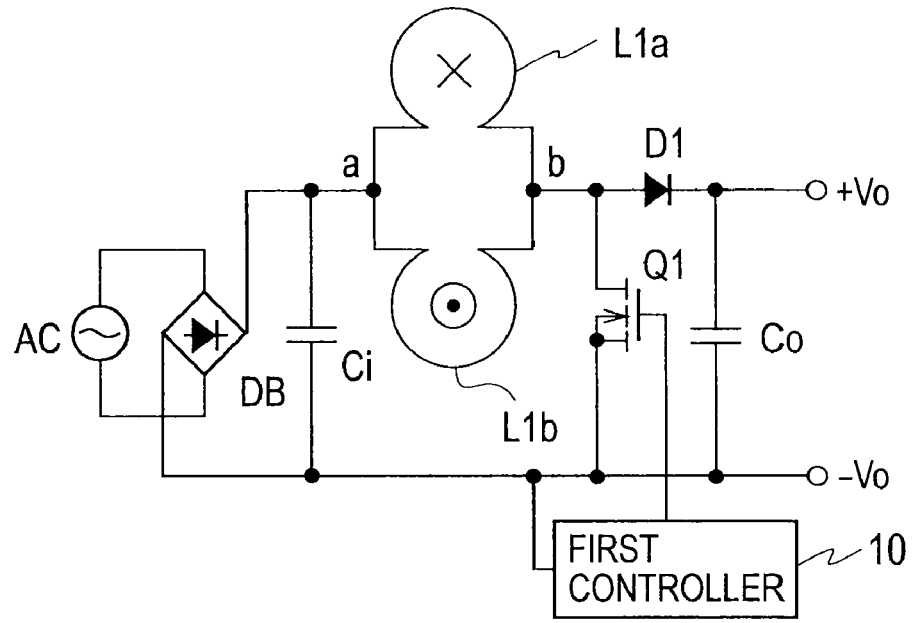
FIGS. 3A and 3B are circuit diagrams illustrating the polarities of magnetic flux of reactors according to Embodiment 1.
Figure 3B:
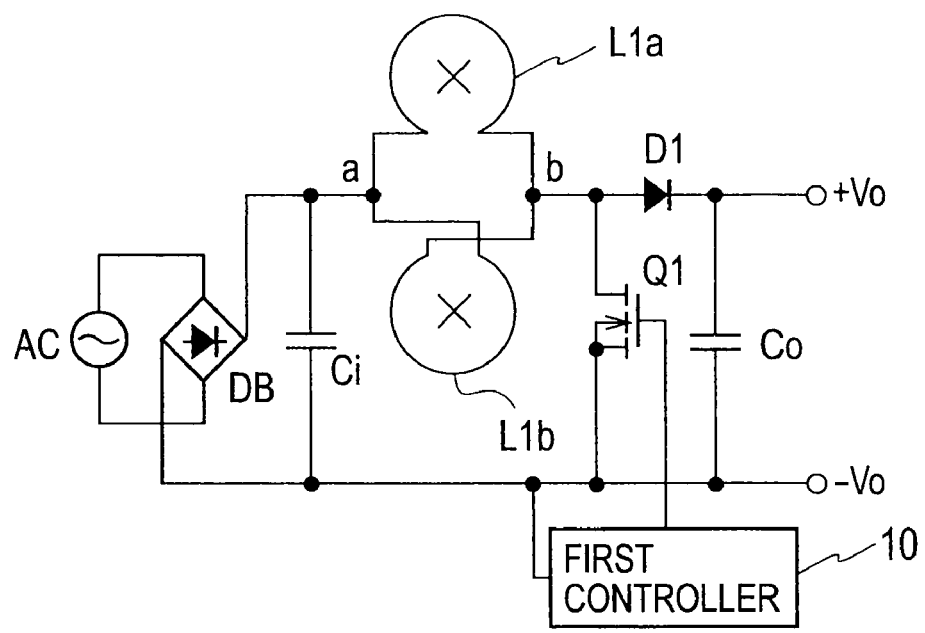

The first and second reactors L1a and L1b may be arranged in two ways as illustrated in FIGS. 3A and 3B.

In FIG. 3A, the first and second reactors L1a and L1b are arranged so as to cancel magnetic flux, and in FIG. 3B, they are arranged so as to enhance magnetic flux. Namely, in FIG. 2, the first and second reactors L1a and L1b are arranged to cancel magnetic flux, so that leakage flux passing through the radiation fin 11 is reduced to minimize noise.

In FIG. 2, the first and second reactors L1a and L1b are thermally coupled with the radiation fin 11, to radiate heat generated by the reactors L1a and L1b. Even in this case, the leakage flux minimizing arrangement of the reactors L1a and L1b suppresses noise generation.

In FIG. 2, each of the first and second reactors L1a and L1b is illustrated with a single turn without a magnetic core (iron core) for the sake of easy understanding. In practice, each reactor is provided with a winding having a plurality of turns and a magnetic core such as a ferrite core. The magnetic core may be any one of EI-, EE-, drum-, and pot-type cores.

Embodiment 2

Figure 4:
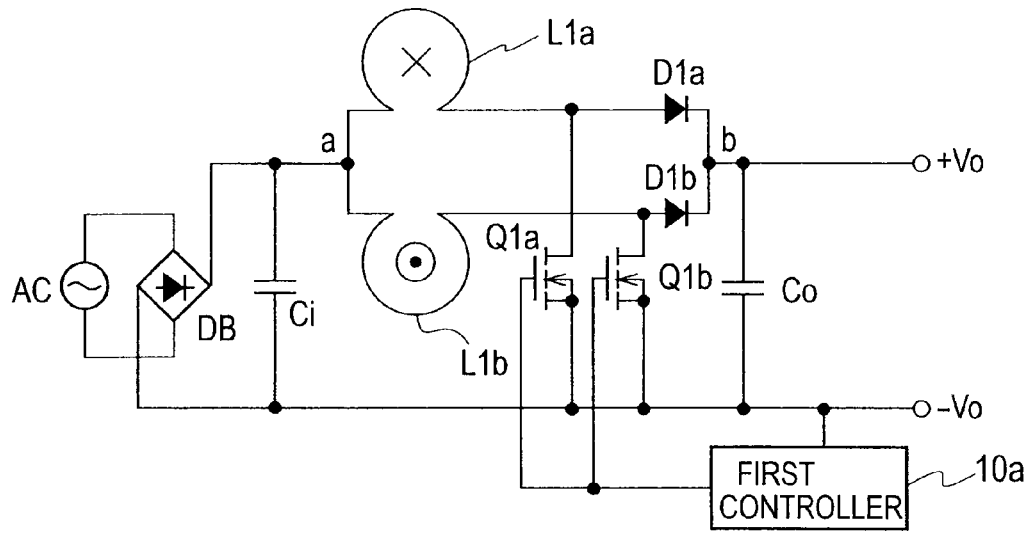
FIG. 4 is a circuit diagram illustrating a power source apparatus according to Embodiment 2 of the present invention.

FIG. 4 is a circuit diagram illustrating a power source apparatus according to Embodiment 2 of the present invention. In FIG. 4, the power source apparatus is applied to a power factor corrector.

According to Embodiment 2, a series circuit including a first reactor L1a and a diode D1a and a series circuit including a second reactor L1b and a diode D1b are connected in parallel with each other between connection points a and b.

A connection point between the first reactor L1a and an anode of the diode D1a is connected to a drain of a switching element Q1a. A connection point between the second reactor L1b and an anode of the diode D1b is connected to a drain of a switching element Q1b. A first controller 10a simultaneously conducts ON/OFF control of the switching elements Q1a and Q1b.

Operation of the power source apparatus of Embodiment 2 is similar to that of Embodiment 1 illustrated in FIG. 2 and effect thereof is also similar to that of Embodiment 1. Using the switching elements Q1a and Q1b is advantageous in halving a current passing through one switching element and quartering leakage inductance energy.

Embodiment 3

Figure 5:
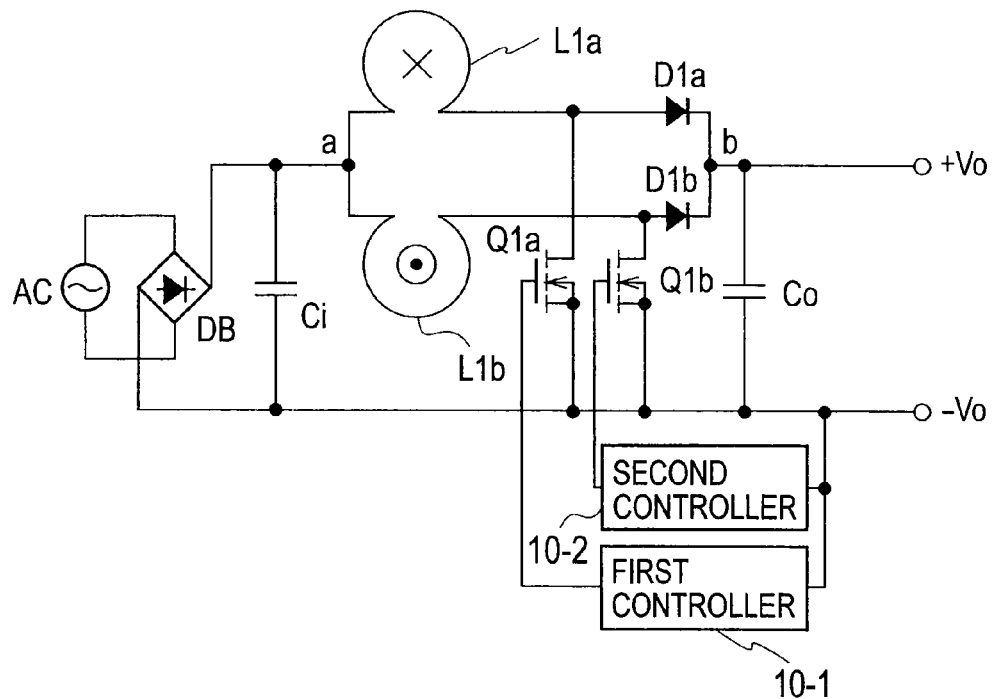
FIG. 5 is a circuit diagram illustrating a power source apparatus according to Embodiment 3 of the present invention.

FIG. 5 is a circuit diagram illustrating a power source apparatus according to Embodiment 3 of the present invention. In FIG. 5, the power source apparatus is applied to a power factor corrector.

The power source apparatus of Embodiment 3 employs a first controller 10-1 to conduct ON/OFF control of a switching element Q1a and a second controller 10-2 to conduct ON/OFF control of a switching element Q1b.

The first and second controllers 10-1 and 10-2 synchronize switching frequencies with each other.

The power source apparatus of Embodiment 3 operates like that of Embodiment 1 and provides similar effect.

Embodiment 4

Figure 6:
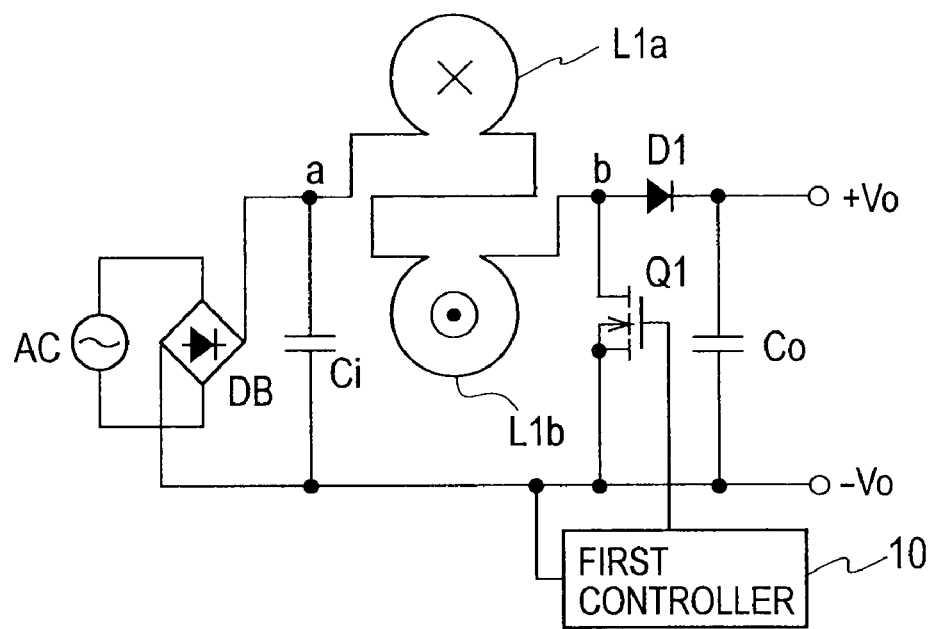
FIG. 6 is a circuit diagram illustrating a power source apparatus according to Embodiment 4 of the present invention.

FIG. 6 is a circuit diagram illustrating a power source apparatus according to Embodiment 4 of the present invention. In FIG. 6, the power source apparatus is applied to a power factor corrector.

In FIG. 6, first and second reactors L1a and L1b are connected in series between connection points a and b and are arranged to face each other.

The power source apparatus of Embodiment 4 operates like that of Embodiment 1 and provides similar effect.

Embodiment 5

Figure 7:
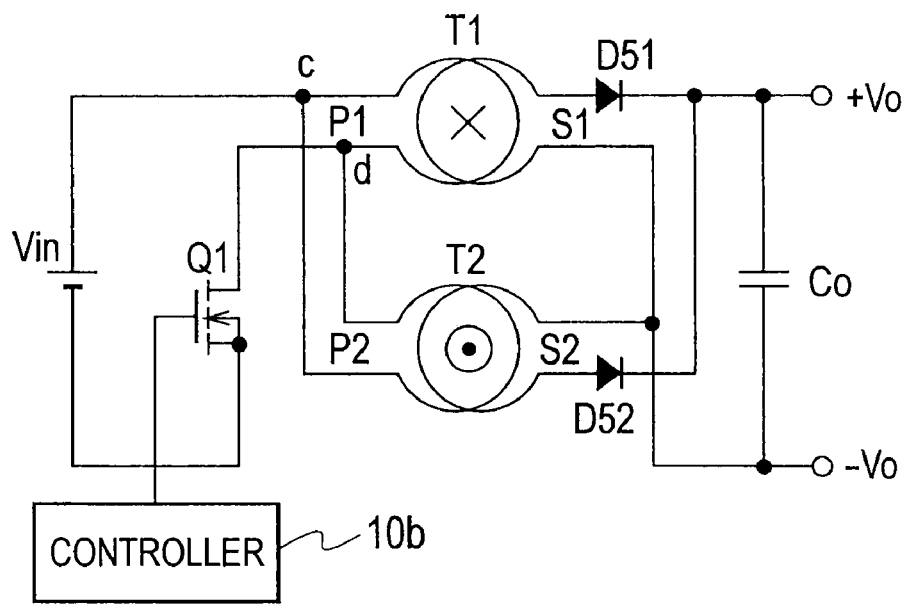
FIG. 7 is a circuit diagram illustrating a power source apparatus according to Embodiment 5 of the present invention.

FIG. 7 is a circuit diagram illustrating a power source apparatus according to Embodiment 5 of the present invention. In FIG. 7, the power source apparatus is applied to a flyback DC-DC converter.

In FIG. 7, connected between both ends of a DC power source Vin is a series circuit including a primary winding P1 of a transformer T1 and a switching element Q1. The primary winding P1 of the transformer T1 is connected in parallel to a primary winding P2 of a transformer T2. A drive terminal of the switching element Q1 is connected to a controller 10b.

A secondary winding S1 of the transformer T1 is connected through a diode D51 to an output smoothing capacitor Co and a secondary winding S2 of the transformer T2 is connected through a diode D52 to the output smoothing capacitor Co.

The windings P1 and S1 of the transformer T1 are arranged to face the windings P2 and S2 of the transformer T2. The polarity of magnetic flux generated by the transformer T1 is opposite to the polarity of magnetic flux generated by the transformer T2.

Operation of the power source apparatus according to Embodiment 5 will be explained.

The controller 10b conducts ON/OFF control of the switching element Q1. When the switching element Q1 is turned on, a current passes through a path extending along Vin, P1-P2, Q1, and Vin, to accumulate energy in the transformers T1 and T2 serving as inductance elements.

When the switching element Q1 is turned off, the energy accumulated in the transformers T1 and T2 is discharged from the secondary windings S1 and S2 of the transformers T1 and T2 and is passed through the diodes D51 and D52, to charge the output smoothing capacitor Co.

The controller 10b adjusts the duty ratio (ON/OFF period) of the switching element Q1 so as to keep the output voltage of the output smoothing capacitor Co at a constant value.

According to Embodiment 5, the transformers T1 and T2 are arranged to cancel magnetic flux and reduce leakage magnetic flux to a radiation fin 11 with which the transformers T1 and T2 are thermally coupled. The power source apparatus of Embodiment 5 operates like that of Embodiment 1 illustrated in FIG. 2 and provides similar effect.

The above-mentioned Embodiments 1 to 5 are not intended to restrict the present invention. According to Embodiments 1 to 5, the power source apparatus is applied to a power factor corrector or a flyback circuit. The power source apparatus is also applicable to a chopper circuit, forward converter, resonant converter, and the like.

The reactors and transformers employed by the present invention may be of any type selected from drum, EI, EE, toroidal, and other types, to provide the operation and effect explained above. A plurality of circuit blocks each including reactors or transformers and related elements arranged according to the present invention may be connected in parallel or in series.

As mentioned above, the power source apparatus according to the present invention employs a pair of reactors each having a winding serving as an inductance element. The reactors are arranged so that the windings face each other and the polarity of magnetic flux from one winding is opposite to the polarity of magnetic flux from the other winding. Namely, the windings are oriented to cancel magnetic flux. This arrangement reduces leakage magnetic flux to a metal body such as a radiation fin with which the reactors are thermally coupled and minimizes switching noise. There is no need of additional parts to cope with the switching noise, and therefore, the power source apparatus is manufacturable with simple line filters at low cost and in reduced size.

In the case of the power source apparatus employing a pair of transformers according to the present invention, windings of the transformers serving as inductance elements are arranged so that they face each other and the polarity of magnetic flux from one transformer opposes the polarity of magnetic flux from the other transformer. This power source apparatus provides the same effect as that provided by the power source apparatus employing reactors.

This application claims benefit of priority under 35 USC §119 to Japanese Patent Applications No. 2008-297647, filed on Nov. 21, 2008, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A power source apparatus comprising:
a power source part;
a pair of reactors each having a winding about a magnetic core;
a radiator thermally coupled to the windings and the magnetic cores; and
a controller configured to accumulate energy of the power source part in the pair of reactors and control the accumulated energy by turning on/off a switching element, wherein
the windings of the pair of reactors are arranged so that the windings face each other and the polarities of magnetic flux from the windings are opposite to each other.

2. A power source apparatus comprising:
a power source part;
a pair of transformers each having a plurality of windings about a corresponding magnetic core;
a radiator thermally coupled to the plurality of windings and the magnetic cores of the pair of transformers; and
a controller configured to accumulate energy of the power source part in the pair of transformers and control the accumulated energy by turning on/off a switching element, wherein
the plurality of windings of the pair of transformers is arranged so that the windings face each other and the polarities of magnetic flux from the windings are opposite to each other.

3. The power source apparatus of claim 1, wherein the reactors are connected to each other in one of series connection and parallel connection.

4. The power source apparatus of claim 2, wherein the windings of the transformers are connected to each other in one of series connection and parallel connection.

* * * * *